United States Patent [19]

Fujimoto et al.

[11] Patent Number: 5,094,331

[45] Date of Patent: Mar. 10, 1992

[54] WET-TYPE MULTIPLATE CLUTCH

[75] Inventors: Katsumi Fujimoto; Hisanori Esaki, both of Wako; Kunihiko Azuma, Hamamatsu; Yusuke Oishi, Hamakita; Yasutada Suzuki, Hamamatsu, all of Japan

[73] Assignees: Honda Giken Kogyo Kabushi Kaisha, Tokyo; Kabushiki Kaisha F.C.C., Hamamatsu, both of Japan

[21] Appl. No.: 606,933

[22] Filed: Oct. 31, 1990

Related U.S. Application Data

[63] Continuation of Ser. No. 323,862, Mar. 15, 1989, abandoned.

[30] Foreign Application Priority Data

| Mar. 18, 1988 | [JP] | Japan | 63-35819[U] |
| Mar. 18, 1988 | [JP] | Japan | 63-35820[U] |
| Mar. 30, 1988 | [JP] | Japan | 63-43312[U] |
| Mar. 30, 1988 | [JP] | Japan | 63-43313 |
| Mar. 30, 1988 | [JP] | Japan | 63-43314 |

[51] Int. Cl.$^5$ .................. F16D 13/64; F16D 13/72; F16D 13/74
[52] U.S. Cl. .................. 192/70.12; 192/107 R; 192/113 B
[58] Field of Search ............ 192/70.12, 70.14, 113 B, 192/107 R; 188/264 D, 264 E

[56] References Cited

U.S. PATENT DOCUMENTS

| 2,690,248 | 9/1954 | McDowall | 192/113 B |
| 2,850,118 | 9/1958 | Byers | 192/70.14 |
| 3,094,194 | 6/1963 | Kershner | 192/113 B |
| 3,198,295 | 8/1965 | Fangman et al. | 192/113 B X |
| 3,534,842 | 10/1970 | Davison | 192/107 R X |
| 4,027,758 | 6/1977 | Gustavsson et al. | 192/113 B |
| 4,139,085 | 2/1979 | Kanbe et al. | 192/107 R |
| 4,396,100 | 8/1983 | Eltze | 192/70.12 |
| 4,674,616 | 6/1987 | Mannino | 192/113 B X |
| 4,726,455 | 2/1988 | East | 192/70.14 X |
| 4,913,267 | 4/1990 | Campbell et al. | 192/113 B X |

FOREIGN PATENT DOCUMENTS 341243  1/1931  United Kingdom ............ 192/113 B Primary Examiner—Rodney H. Bonck

[57] ABSTRACT

A wet-type multiplate clutch for selectively transmitting drive forces from an engine to a road wheel has a plurality of clutch discs adapted to be coupled to the engine and each having a frictional surface, and a plurality of clutch plates adapted to be coupled to the road wheel, of clutch discs and the clutch plates being alternately interleaved and arranged so that the clutch discs and the clutch plates can be pressed against and separated from each other. Each of the clutch discs having a ring-shaped frictional member or a plurality of frictional members on the frictional surface, and radial oil passages for allowing oil to pass therethrough and oil grooves for retaining oil therein.

7 Claims, 17 Drawing Sheets

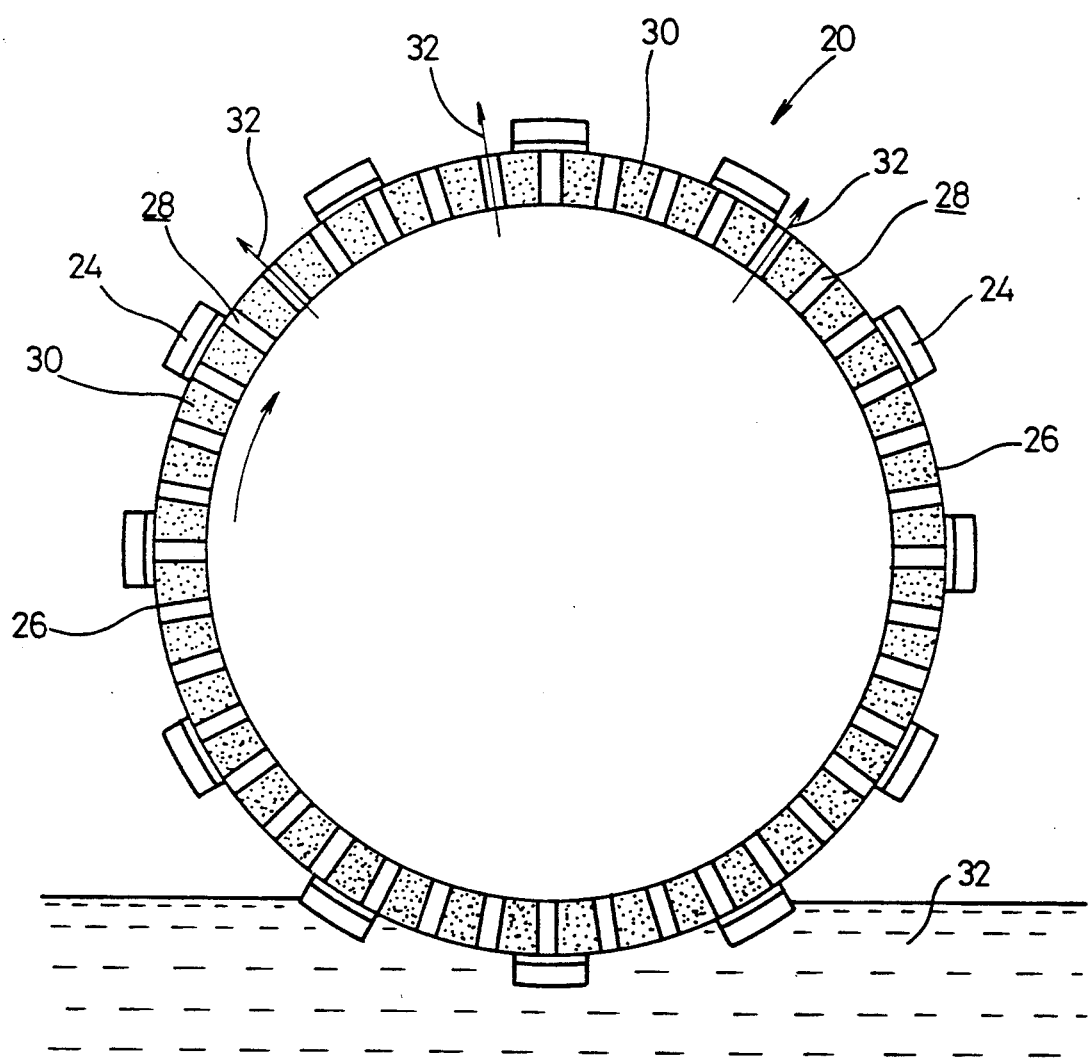

WET-TYPE MULTIPLATE CLUTCH

This application is a continuation of application Ser. No. 07/323,862 filed on Mar. 15, 1989, now abandoned.

BACKGROUND OF THE INVENTION

The present invention relates to a wet-type multiplate clutch, and more particularly to a wet-type multiplate clutch comprising a plurality of clutch discs coupled to an engine and a plurality of clutch plates coupled to a wheel, the clutch discs and plates being alternately interleaved so that they can be pressed against and spaced from each other, and also being supplied with cooling oil therebetween.

Generally, clutches selectively transmit drive forces generated by an engine to a wheel and cut off the transmission of drive forces from the engine to the wheel. The clutches are mainly grouped into two types, i.e., a dry-type multiplate clutch and a wet-type multiplate clutch. The wet-type multiplate clutch finds wide use on two-wheeled motor vehicles such as motorcycles which have a relatively small vehicle body weight with respect to the drive force generated by the engine, since the wet-type multiplate clutch does not suffer a large shock when the motorcycle transmission effects a gear shift.

The wet-type multiplate clutch on a motor vehicle comprises a plurality of clutch discs coupled to the engine and a plurality of clutch plates coupled to a wheel, the clutch discs and plates being alternately interleaved and supplied with oil therebetween. The drive forces from the engine can be transmitted to the wheel by pressing the clutch plates against the clutch discs.

FIGS. 1(a) and 1(b) of the accompanying drawings illustrate a conventional clutch disc for use in a wet-type multiplate clutch, disclosed in Japanese Laid-Open Utility Model Publication No. 50-30145. A clutch disc 2 comprises a centrally open disc plate 6 having a plurality of engaging teeth 4 on its outer periphery, with ring shaped frictional members 10 being attached to opposite surfaces of the clutch disc 2. Each of the frictional members 10 has eight radial oil passages 8 defined in one surface thereof at angularly spaced intervals and eight oil grooves 9 (see FIG. 1(b)) of an inverted J-shaped cross section each having one end opening at the inner peripheral surface of the frictional member 10 and the other end closed at the surface of the frictional member 10, the oil passages 8 and oil grooves 9 being alternately arranged as shown in FIG. 1(a).

The clutch disc 2 is rotatable in the direction of the arrow by engagement of the engaging teeth 4 with an outer clutch member (not shown) directly coupled to an engine. When a clutch plate (not shown) is pressed against the clutch disc 2, the clutch disc 2 and the clutch plate are frictionally joined to each other through a frictional surface 11 of the frictional member 10 to transmit the drive forces from the engine to a wheel coupled to the clutch plate. The clutch disc 2 and the clutch plate are partly immersed in oil 12. The oil 12 is discharged into a central region of the clutch by an oil pump (not shown), and forced to flow radially outwardly via the radial oil passages 8 under centrifugal forces produced upon rotation of the clutch disc 2. At the same time, the oil 12 is retained in the oil grooves 9. The oil 12 serves to remove frictional heat generated when the clutch disc 2 and the clutch plate are pressed against each other, and also serves to absorb shocks produced when the clutch disc 2 and the companion clutch plate are engaged and disengaged.

The clutch disc 2 is required to be durable since it is frictionally held against the clutch plate each time a transmission gear shift is effected, and also required to be smoothly pressed against and separated from the clutch plate when the clutch is engaged and disengaged. The increased durability of the clutch disc 2 results in a reduced maintenance cost, and the smooth engagement and disengagement gives rise to improved riding comfort. According to the illustrated prior clutch disc 2, a cooling effect provided by the oil 12 flowing through the oil passage 8 is aimed at increased durability of the clutch disc 2, whereas an oil pressure developed by centrifugal forces acting on the oil 12 retained in the oil grooves 9 is designed to increase smoothness in engaging and disengaging the clutch.

It has however been confirmed by the inventor that the illustrated numbers and shapes of the oil passages 8 and oil grooves 9 are not sufficient to provide a desired cooling effect and oil pressure. More specifically, the produced cooling effect is not strong enough since the oil passages 8 available on a single clutch disc 2 are few, and only a very small amount of oil is retained in the oil grooves 9 with their cross-sectional shape progressively smaller toward the radially outer end thereof.

Another conventional clutch disc for use in a wet-type multiplate clutch, as disclosed in Japanese Laid-Open Utility Model Publication No. 54-63850 is illustrated in FIG. 2 of the accompanying drawings. The clutch disc, generally denoted by 20, comprises centrally open disc plate 26 having a plurality of engaging teeth 24 on its outer periphery, with ring shaped frictional members 30 being attached to opposite surfaces of the clutch disc 20. Each of the frictional members 30 has a plurality of radial oil passages 28 defined in one surface thereof at angularly spaced intervals. The clutch disc 20 is rotatable in the direction of the arrow by engagement of the engaging teeth 24 with an outer clutch member (not shown) directly coupled to an engine. When a clutch plate (not shown) is pressed against the clutch disc 20, the clutch disc 20 and the clutch plate are frictionally joined to each other through the frictional member 30 to transmit the drive forces from the engine to a wheel coupled to the clutch plate. Oil 32 is supplied between the clutch disc 20 and the clutch plate. The oil 32 is forced to flow radially outwardly via the radial oil passages 28 under centrifugal forces produced upon rotation of the clutch disc 20. The oil 32 is effective to remove frictional heat by flowing through the oil passages 28, the frictional heat being generated when the clutch disc 20 and the clutch plate are pressed against each other, and also effective to absorb shocks produced when the clutch disc 20 and the companion clutch plate are engaged and disengaged.

The oil passages 28 thus arranged however still fail to make the clutch disc 20 sufficiently durable and also to allow the clutch to be engaged and disengaged sufficiently smoothly.

One proposal to increase the durability of a wet-type clutch disc would be to increase the diameter of a companion clutch plate to obtain an increased contact area. However, an increase in the diameter of the clutch plate would adversely affect the entire design or construction of the body of a two-wheeled vehicle such as a motorcycle in which the clutch is incorporated.

SUMMARY OF THE INVENTION

It is a general object of the present invention to provide a wet-type multiplate clutch having improved clutch discs designed for increased durability thereof and smooth engagement and disengagement of the clutch.

Another object of the present invention is to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ring-shaped frictional member on said frictional surface, said frictional member having a plurality of substantially C-shaped frictional surfaces spaced at predetermined intervals with oil passages each defined between adjacent ones of the frictional surfaces, said C-shaped frictional surfaces having respective oil grooves defined therein and opening radially centrally of the clutch disc, said oil grooves being wider than said oil passages.

Still another object of the present invention is to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a plurality of oil passages defined in said frictional surface and spaced at predetermined intervals, each of said oil passages having a width progressively smaller in a direction away from a center of the clutch disc to an outer circumferential edge of the clutch disc.

Yet another object of the present invention is to provide a wet-type multiplate clutch wherein each of said clutch plates has at least one groove defined in at least one side surface thereof for pressed engagement with the frictional surface of the clutch disc, thereby reducing a substantial area of contact between the clutch disc and the clutch plate.

Yet still another object of the present invention is to provide a wet-type multiplate clutch wherein each of said clutch plates has a plurality of holes defined therethrough at a side surface thereof for pressed engagement with the frictional surfaces of the clutch disc, thereby reducing a substantial area of contact between the clutch disc and the clutch plate.

A further object of the present invention is to provide a wet-type multiplate clutch for selectively transmitting drive forces from an engine to a road wheel, comprising: a plurality of clutch discs adapted to be coupled to the engine; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a plurality of frictional surfaces and a plurality of oil passages defined alternately with the frictional surfaces, said frictional surfaces having ends tapered in the direction of rotation of said clutch disc and/or the direction opposite to said direction of rotation of the clutch disc.

A still further object of the present invention is to provide a wet-type multiplate clutch wherein each of said frictional surfaces comprises an attached frictional member having at least one pointed end.

A yet further object of the present invention is to provide a wet-type multiplate clutch wherein each of said frictional surfaces comprises an attached frictional member having at least one arcuate end.

A yet still further object of the present invention is to provide a wet-type multiplate clutch wherein each of said frictional surfaces comprises an attached circular frictional member.

Another object of the present invention is to provide a wet-type multiplate clutch wherein each of said frictional surfaces comprises an attached oblong frictional member which is elongate in said direction of rotation of the clutch disc.

It is also an object of the present invention to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ring-shaped frictional member on said frictional surface, said frictional member having a plurality of first radial oil passages defined in a surface thereof at spaced intervals extending in a direction away from a center of the clutch disc to an outer circumferential edge of the clutch disc, and a plurality of second radial oil passages defined in said surface and each positioned between adjacent ones of the first oil passages, said second oil passages being shallower than said first oil passages.

Still another object of the present invention is to provide a wet-type mutiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ringshaped frictional member on said frictional surface, said frictional member having a plurality of first radial oil passages defined in a surface thereof at spaced intervals extending in a direction away from a center of the clutch disc to an outer circumferential edge of the clutch disc, and at least one second circumferential oil passage defined in said surface substantially perpendicularly to said first oil passages and positioned between adjacent one of the first oil passages, said second oil passage being shallower than said first oil passages.

Yet another object of the present invention is to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ringshaped frictional member on said frictional surface, said frictional member having a plurality of first radial oil passages defined in a surface thereof at spaced intervals extending in a direction away from a center of the clutch disc to an outer circumferential edge of the clutch disc, and at least one second circumferential oil passage defined in said surface substantially perpendicularly to said first oil passages, said second oil passage being as deep as said first oil passages.

Yet still another object of the present invention is to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ringshaped frictional member on said frictional surface, said frictional member having a plurality of radial oil passages defined in a surface thereof at spaced intervals extending in a direction away from a center of the clutch disc to an outer circumferential edge of the clutch disc, and a plurality of dimples defined in said surface between said radial oil passages.

A further object of the present invention is to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so that the clutch discs and the clutch plates can be pressed against and separated from each other; and each of said clutch plates having at least one oil grooves defined in at least one side surface of the clutch plate for pressed engagement with the frictional surface of the clutch disc, thereby reducing a substantial area of contact of the clutch plate with the clutch disc.

A yet further object of the present invention is to provide a wet-type multiplate clutch for selectively transmitting drive forces from an engine to a road wheel, comprising: a plurality of clutch discs adapted to be coupled to the engine and each having a frictional surface; a plurality of clutch plates adapted to be coupled to the road wheel, said clutch discs and said clutch plates being alternately interleaved and arranged so hat the clutch discs and the clutch plates can be pressed against and separated from each other; and each of said clutch plates having a plurality of holes defined therethrough at a side surface thereof for pressed engagement with the frictional surface of the clutch disc, thereby reducing a substantial area of contact of the clutch plate with the clutch disc.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a front elevational view of another conventional clutch disc for use in a wet-type multiplate clutch;

DETAILED DESCRIPTION OF THE PREFERRED EMBODIMENTS

Figure 3:
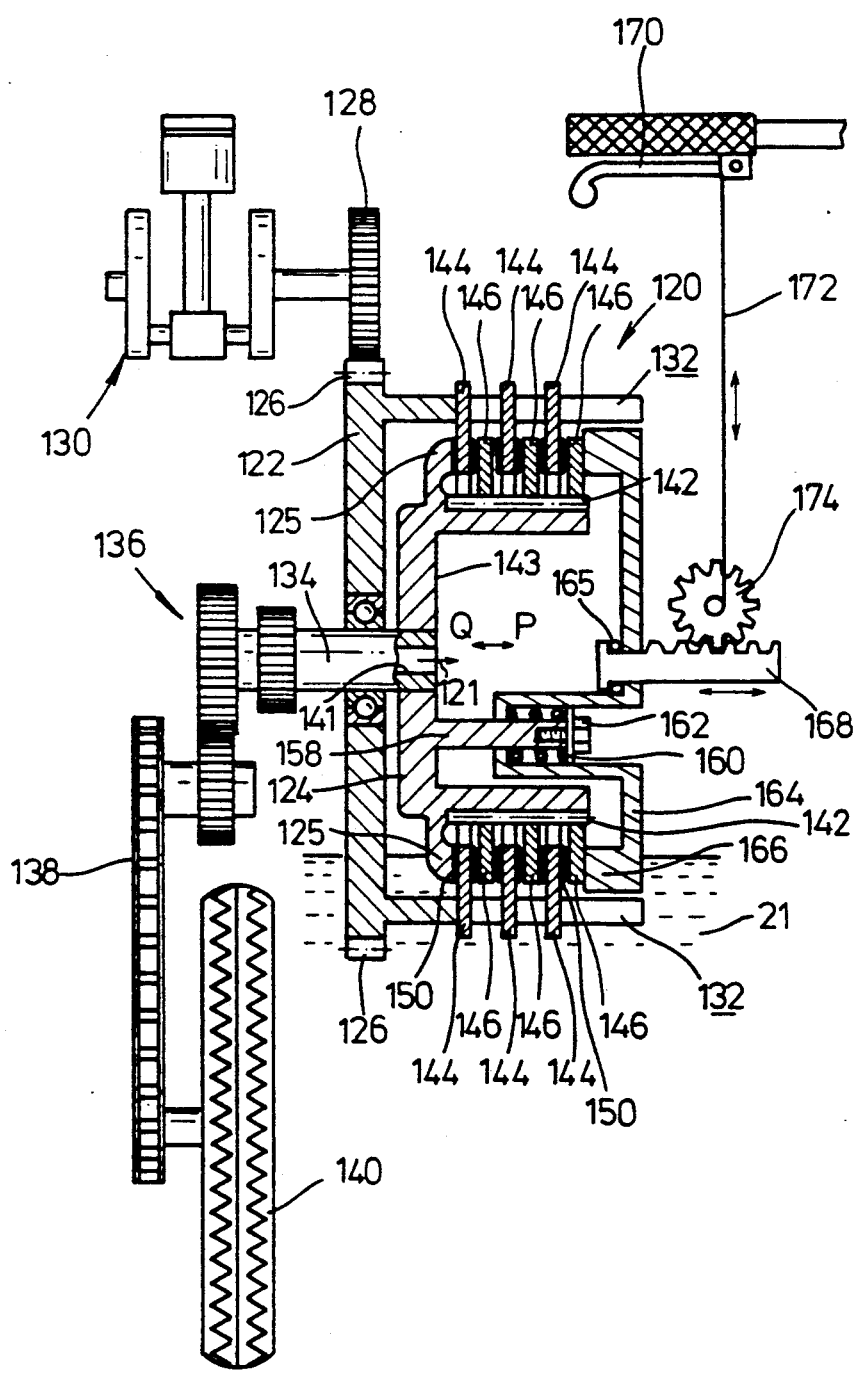
FIG. 3 is a schematic cross-sectional view of a wet-type multiplate clutch according to the present invention.
Figure 4:
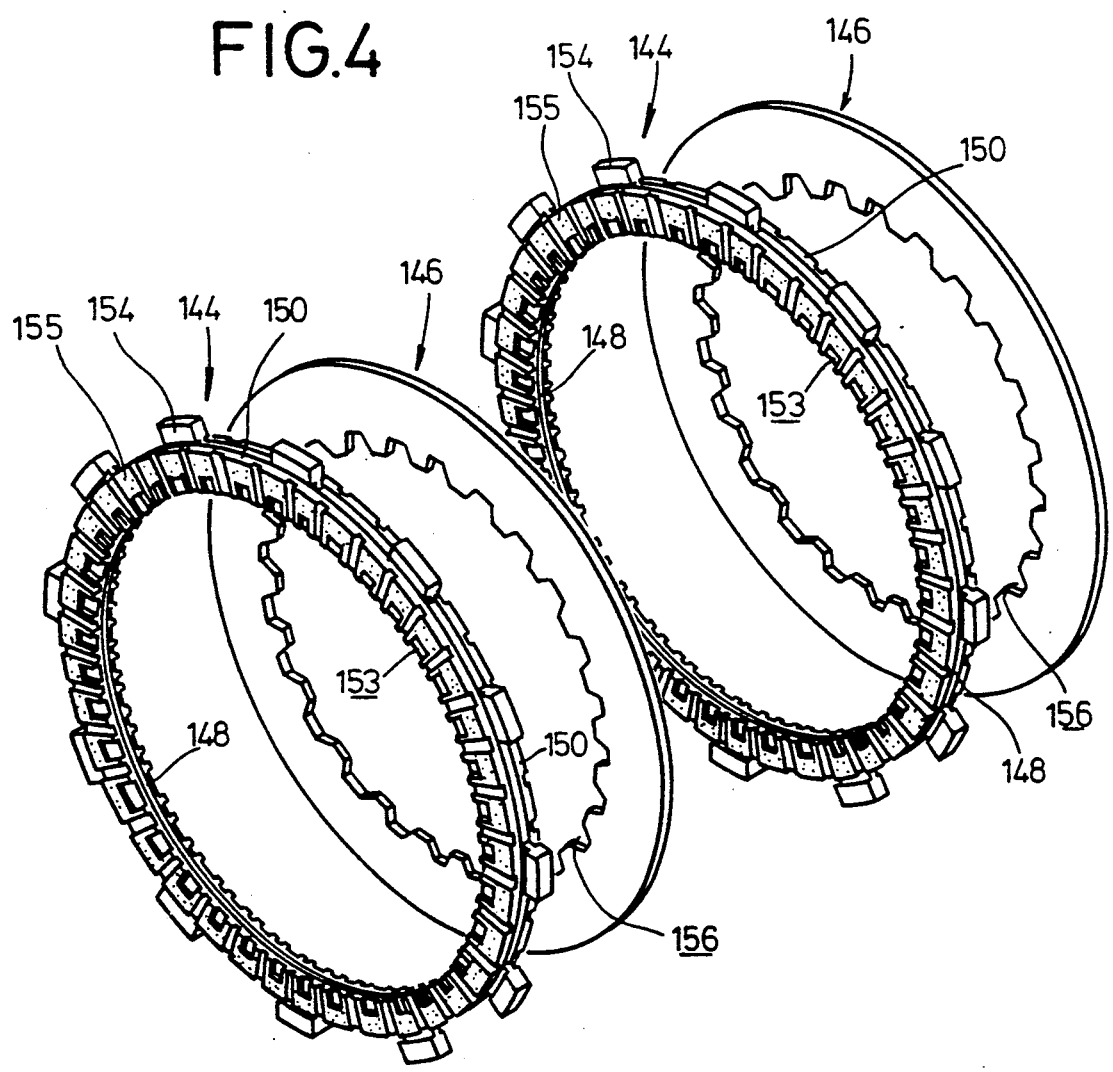
FIG. 4 is an exploded perspective view of clutch discs and clutch plates for use in the wet-type multiplate clutch shown in FIG. 3.

FIG. 3 shows a wet-type multiplate clutch, generally designated by the reference numeral 120, for use in a two-wheeled motor vehicle such as a motorcycle. The wet-type multiplate clutch 120 includes an outer clutch member 122 and a central clutch member 124 rotatably disposed in the outer clutch member 122.

The outer clutch member 122 has a driven gear 126 on the outer periphery of one axial end thereof, the driven gear 126 being held in mesh with a gear 128 connected to the crankshaft of an engine 130 of the motorcycle. The outer clutch member 122 also has a plurality of grooves 132 defined in an axially extending side wall thereof at predetermined angularly spaced intervals and extending axially toward the other axial end of the outer clutch member 122. The central clutch member 124 is rotatably supported by the outer clutch member 122 through a cylindrical main shaft 134 securely mounted centrally in the central clutch member 124. The main shaft 134 is operatively coupled to a rear road wheel 140 of the motorcycle through a gear train 136 and a chain 138. Oil 121 is pressure-fed into an oil supply passage 141 in the main shaft 134 by means of an oil pump (not shown) and then discharged onto an inner surface 143 of the central clutch member 124. The central clutch member 124 includes a side wall 125 having a plurality of splines 142 extending along the generators of the side wall 125.

In the side wall 125 of the central clutch member 124, there are alternately fitted a plurality of clutch discs 144 and a plurality of clutch plates 146 as shown in FIGS. 4, 5(a), 5(b), and 5(c). Each of the clutch discs 144 comprises a disc plate 148 having a central circular opening defined therein and a pair of ring-shaped frictional members 150 attached respectively to the opposite surfaces of the disc plate 148. The frictional members 150 are each in the form of a sheet of sintered metal or paper impregnated with a resin.

Figure 5A:
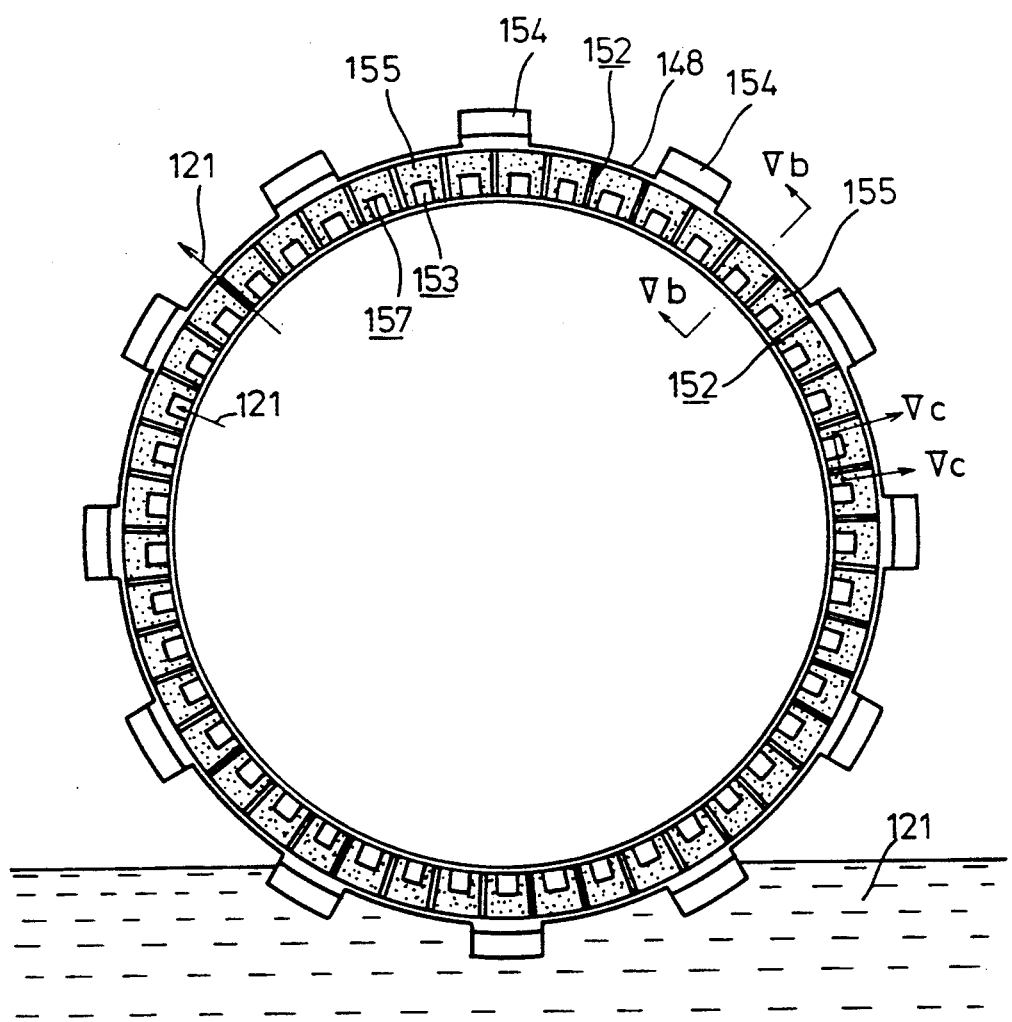
FIG. 5(a) is a front elevational view of one of the clutch discs shown in FIG. 4.
Figure 5:
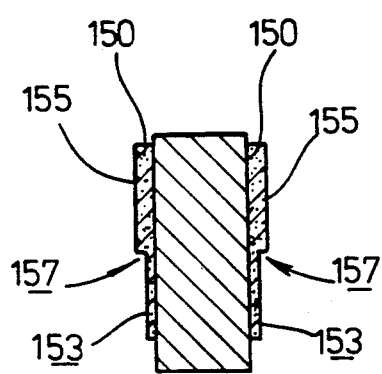
FIG. 5(b) is an enlarged cross-sectional view taken along line Vb—Vb of FIG. 5(a)
FIG. 5(c) is an enlarged cross-sectional view taken along line Vc—Vc of FIG. 5(a)
Figure 5:
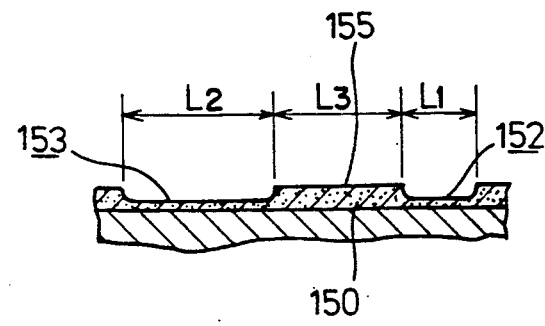

Each frictional member 150 has a plurality of substantially U-shaped oil passages 152 defined in an exposed surface thereof and extending radially outwardly in the direction away from the clutch disc 144 from the inner peripheral edge to outer peripheral edge of the frictional member 150. The oil passages 152 have a width of $L_1$ (see FIG. 5(c)) and are circumferentially spaced at predetermined intervals. The frictional member 150 also has a plurality of oil grooves 153 defined in its exposed surface and extending radially outwardly from the inner peripheral edge thereof to a position short of the outer peripheral edge of the frictional member 150, the oil grooves 153 having a width of $L_2$ (FIG. 5(c)). The width $L_2$ of the oil grooves 153 is larger than the width $L_1$ of the oil passages 152 so that the volume of each oil groove 153 is substantially greater than the volume of each oil passage 152. The oil passages 152 and the oil grooves 153 are alternately positioned, and each combination of a pair of adjacent oil passages 152 and an oil groove 153 disposed therebetween defines a C-shaped frictional surface 155 (see FIG. 5(a)). As shown in FIG. 5(c), the C-shaped frictional surface 155 has a pair of spaced legs each having a width of $L_3$. There are a plurality of, preferably nine, frictional surfaces 155 on the frictional member 150. The radially outer edge of each oil groove 153 and the corresponding frictional surface 155 are joined to each other by a boundary surface 157 (FIG. 5(b)) which extends substantially perpendicularly to the bottom of the oil groove 153 and the frictional surface 155.

The disc pate 148 has on its outer circumferential surface a plurality of engaging teeth 154 spaced at prescribed intervals and engaging respectively in the grooves 132 of the side wall of the outer clutch member 122. Each of the clutch plates 146 has a central circular opening and a plurality of recesses 156 (FIG. 4) defined in an inner circumferential edge thereof. The clutch plates 146 are mounted on the central clutch member 146 with the splines 142 engaging respectively in the recesses 156.

As shown in FIG. 3, the central clutch member 124 has an attachment 158 extending axially from the inner surface 143 thereof, and a lifter plate 164 is mounted on the attachment 158 by means of a bolt 162 with a spring 160 acting between the lifter plate 164 and the attachment 158. The lifter plate 164 has a side wall 166 abutting against the outermost clutch plate 146 engaging the central clutch member 124. The lifter plate 164 is normally urged toward the main shaft 134 under the resiliency of the spring 160. A rack 168 is attached centrally to the lifter plate 164 through a slide bearing 165. The rack 168 is held in mesh with a pinion 174 which can be rotated by a clutch lever 170 through a clutch cable 172.

The wet-type multiplate clutch according to the above embodiment is basically constructed as described above. Operation and advantages of the wet-type multiplate clutch will be described below.

For disconnecting the engine 130 from the rear road wheel 140, the rider of the motorcycle grips the clutch lever 170. The pinion 174 is then turned by the clutch cable 172 to cause the rack 168 meshing with the pinion 174 to displace the lifter plate 164 in the direction of the arrow P (FIG. 3) against the bias of the spring 160. The clutch discs 144 and the clutch plates 146 are now disengaged from each other. Therefore, drive forces transmitted from the engine 130 to the outer clutch member 122 via the gear 128 are applied to rotate the clutch discs 144, but not transmitted to the clutch plates 146. The rider then makes a gear shift.

After the gear shift, the rider releases the clutch lever 170, allowing the lifter plate 164 to be displaced in the direction of the arrow Q under the resiliency of the spring 160. The side wall 166 of the lifter plate 164 then presses the clutch plates 146 toward the clutch discs 144. At this time, the engaging teeth 154 on the outer circumferential edges of the clutch discs 144 engage in the grooves 132 of the outer clutch member 122, and hence the clutch discs 144 are rotated at a high speed by the drive forces from the engine 130. The clutch plates 146 are mounted on the central clutch member 124 with the splines 142 fitted in the respective recesses 156. When the clutch plates 146 are pressed toward the side wall 125 by the lifter plate 164, the clutch discs 144 are pressed against the clutch plates 146 to transmit the rotation of the clutch discs 144 to the central clutch member 124. As a result, the central clutch member 124 rotates with the clutch discs 144, and the rotation of the central clutch member 124 is transmitted from the main shaft 134 to the rear road wheel 140 through the gear train 136 and the chain 138.

As described above, each of the clutch discs 144 against which the clutch plates 146 are frictionally held has the frictional members 150 shown in FIGS. 4 and 5(a) through 5(c), and the oil passages 152 and the oil grooves 153 are defined at spaced intervals in each of the frictional members 150. Since the oil passages 152 extend all the way to the inner and outer circumferential edges of the frictional member 150, when the oil 121 is supplied from the oil supply passage 141 in the main shaft 134 and splashed into oil droplets, the oil 121 flows through the oil passages 152 under centrifugal forces to cool the clutch discs 144 and the clutch plates 146 even while the clutch discs 144 and the clutch plates 146 are being pressed against each other. The oil 121 is also retained in the oil grooves 153 under centrifugal forces to cool the regions around the oil grooves 153 while the clutch is being engaged. The oil 121 retained in each of the oil grooves 153 is stored in a large volume of a rectangular parallelepiped. Inasmuch as the width $L_2$ of the oil grooves 153 is larger than the width $L_1$ of the oil passages 152, the amount of the oil 121 stored in the oil grooves 153 is large enough to increase the cooling effect of the oil 121 on the clutch discs 144 and the clutch plates 146.

The oil 121 stored in the oil grooves 153 is subjected to centrifugal forces while the clutch is being rotated, and hence develops an oil pressure commensurate with the kinetic energy thus applied to the oil 121. The oil pressure thus developed exerts a very large force to the clutch discs 144 and the clutch plates 146 because the amount of the stored oil 121 is large. When the clutch lever 170 is gripped to disengage the clutch, the oil 121 stored in the oil grooves 153 is discharged radially outwardly to assist in separating the clutch discs 144 and the clutch plates 146 away from each other. Therefore, the clutch can smoothly be disengaged.

Figure 1A:
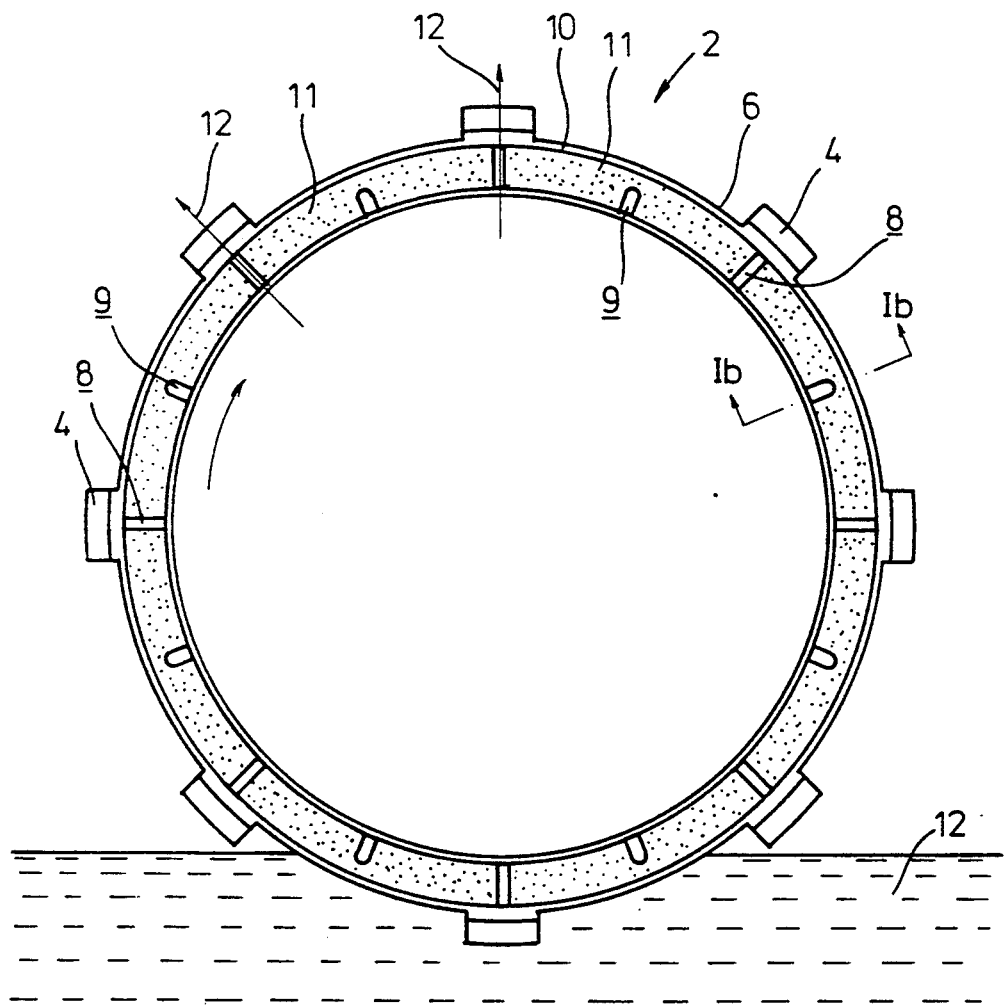
FIG. 1(a) is a front elevational view of a conventional clutch disc for use in a wet-type multiplate clutch.
Figure 1B:
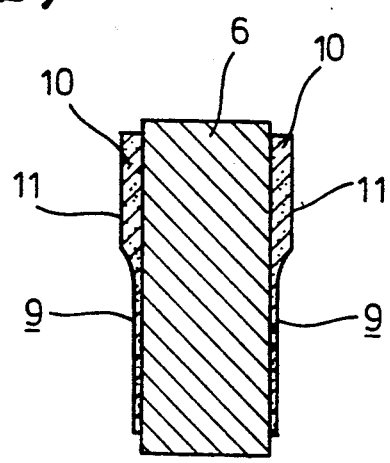
FIG. 1(b) is an enlarged cross-sectional view taken along line Ib—Ib of FIG. 1(a)

The clutch discs 144 can be cooled more effectively than the conventional clutch discs which have the frictional members 10, 30 as shown in FIGS. 1 and 2. The frictional members 150 are less liable to deteriorate, and the clutch discs 144 are more durable. The clutch can be engaged and disengaged highly smoothly.

With the above embodiment, as described above, in the wet-type multiplate clutch for selectively transmitting the drive forces from the engine by pressing or separating the clutch discs and the clutch plates, each of the frictional members of the clutch discs has a plurality of oil passages and extending from the inner to outer circumferential edges of the clutch disc and a plurality of oil grooves extending from the inner circumferential edge of the clutch disc and terminating short of the outer circumferential edge thereof, the oil passages and the oil grooves being defined in the frictional surface of the frictional member and alternately arranged and spaced at prescribed intervals. The oil passages and the oil grooves are constructed such that a large amount of oil will flow through the oil passages and a large amount of oil will be retained in the oil grooves. The volume of the oil grooves for retaining oil therein is substantially larger than the volume of the oil passages for passing oil therethrough. Consequently, the clutch discs can be cooled very effectively. The clutch can smoothly be engaged and disengaged since the oil retained in the oil grooves exerts a large force to the clutch discs and the clutch plates under centrifugal forces when the clutch discs and the clutch plates are pressed against each other.

Figure 6:
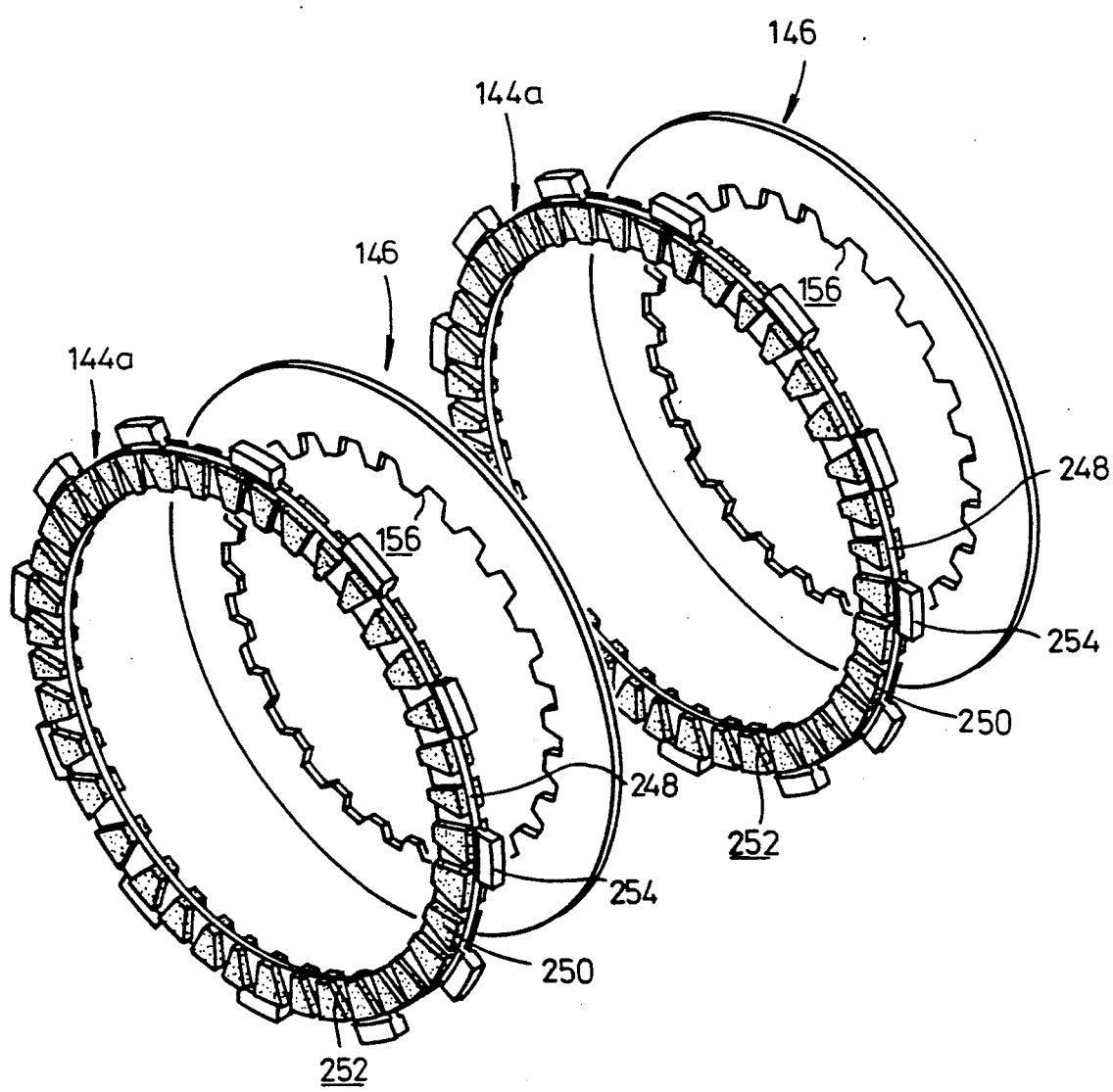
FIG. 6 is an exploded perspective view of clutch discs and clutch plates according to another embodiment for use in the wet-type multiplate clutch shown in FIG. 3.
Figure 7:
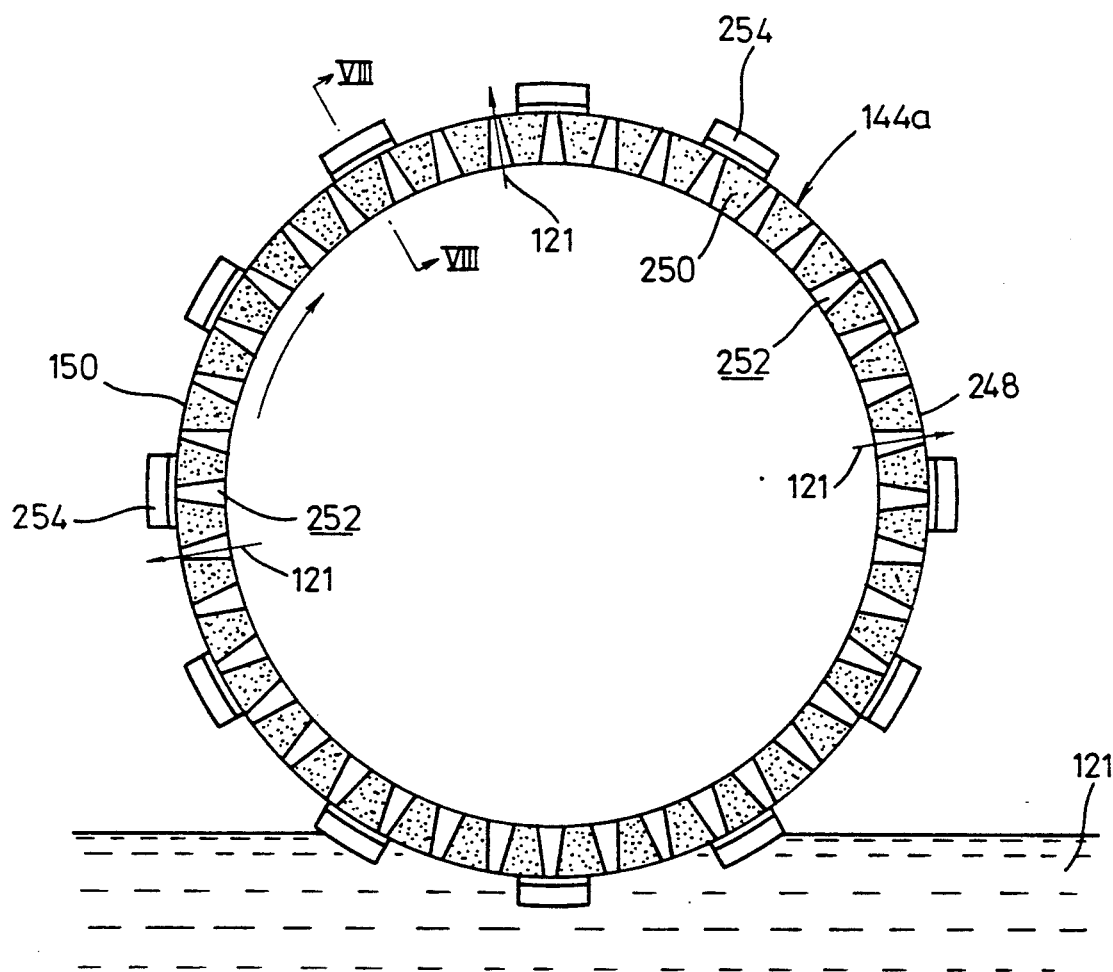
FIG. 7 is a front elevational view of one of the clutch discs shown in FIG. 6.
Figure 8:
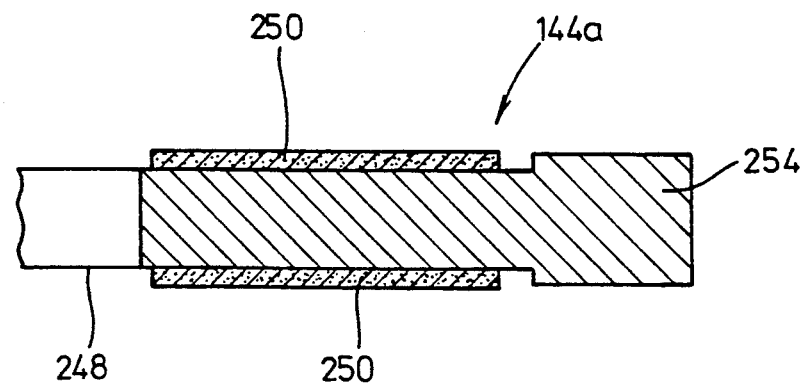
FIG. 8 is enlarged cross-sectional view taken along line VIII—VIII of FIG. 7.

FIGS. 6 through 8 show clutch discs according to another embodiment of the present invention, for use in the wet-type multiplate clutch shown in FIG. 3.

Each of clutch discs 144a comprises a disc plate 248 having a central circular opening defined therein and a plurality of frictional members 250 attached to each of the opposite surfaces of the disc plate 248. The frictional members 250 are each in the form of a sheet of sintered metal or paper impregnated with a resin.

Between the frictional members 250, there are defined a plurality of substantially V-shaped oil passages 252 extending radially outwardly from the inner peripheral edge to outer peripheral edge of the clutch disc 144a. The oil passages 252 have a width progressively smaller in the radially outward direction from the center of the clutch disc 144a toward the outer circumferential edge thereof and are circumferentially spaced at predetermined intervals. The disc plate 248 has on its outer circumferential surface a plurality of engaging teeth 254 spaced at prescribed intervals and engaging respectively in the grooves 132 (see FIG. 3) of the side wall of the outer clutch member 122.

The frictional members 250 are progressively wider in the radially outward direction. Consequently, the area of contact between the clutch discs 144a and the clutch plates 146 is smaller in a region near the center of the clutch discs 144a where the speed of rotation is lower, and larger in a region near the outer circumferential edge of the clutch discs 144 where the speed of rotation is higher. When the clutch discs 144a and the clutch plates 146 are frictionally held against each other, therefore, the frictional members 250 are substantially uniformly worn in the radial direction. As a result, the frictional members 250 are less apt to deteriorate than the conventional frictional member 30 shown in FIG. 2, and the clutch discs 144a are of increased durability.

The oil 121 as it is splashed into oil droplets is supplied between the clutch discs 144a and the clutch plates 146 from the oil supply passage 141 (FIG. 3). When the clutch plates 146 are brought into frictional contact with the clutch discs 144a, the splashed oil 121 flows radially outwardly through the V-shaped oil passages 252 toward the outer edges of the clutch discs 144a. Because the widths of the oil passages 252 at the outer circumferential edges of the clutch discs 144a are small, the oil 121 flowing into the oil passages 252 tends to stay in the oil passages 252 for a long period of time to cool the clutch discs 144a. As a consequence, the clutch discs 144a are not overheated by frictional engagement with the clutch plates 146, but are well cooled and hence made highly durable.

With the above embodiment, as described above, in the wet-type multiplate clutch for selectively transmitting the drive forces from the engine by pressing or separating the clutch discs and the clutch plates, each of the frictional members of the clutch discs has a plurality of oil passages extending and progressively narrower from the inner to outer circumferential edges of the clutch disc. Since the area of contact of the clutch plates with the frictional members is progressively increased in the radially outward direction of the clutch discs, wear on the frictional members is rendered substantially uniform over the entire surface of the clutch discs. The clutch discs are increased in durability and hence the clutch can be used over a prolonged period of time. Inasmuch as the oil passages between the frictional members are progressively narrower in the radially outward direction, the oil flowing into the oil passages tend to stay between the clutch discs and the clutch plates for a long period of time. Accordingly, frictional heat generated when the clutch discs and the clutch plates are held in frictional engagement with each other is effectively absorbed and radiated by the oil in the oil passages, thus further increasing the durability of the clutch discs. Since the durability of the clutch discs is increased without increasing the diameter thereof, the overall size of the clutch remains small.

Figure 9:
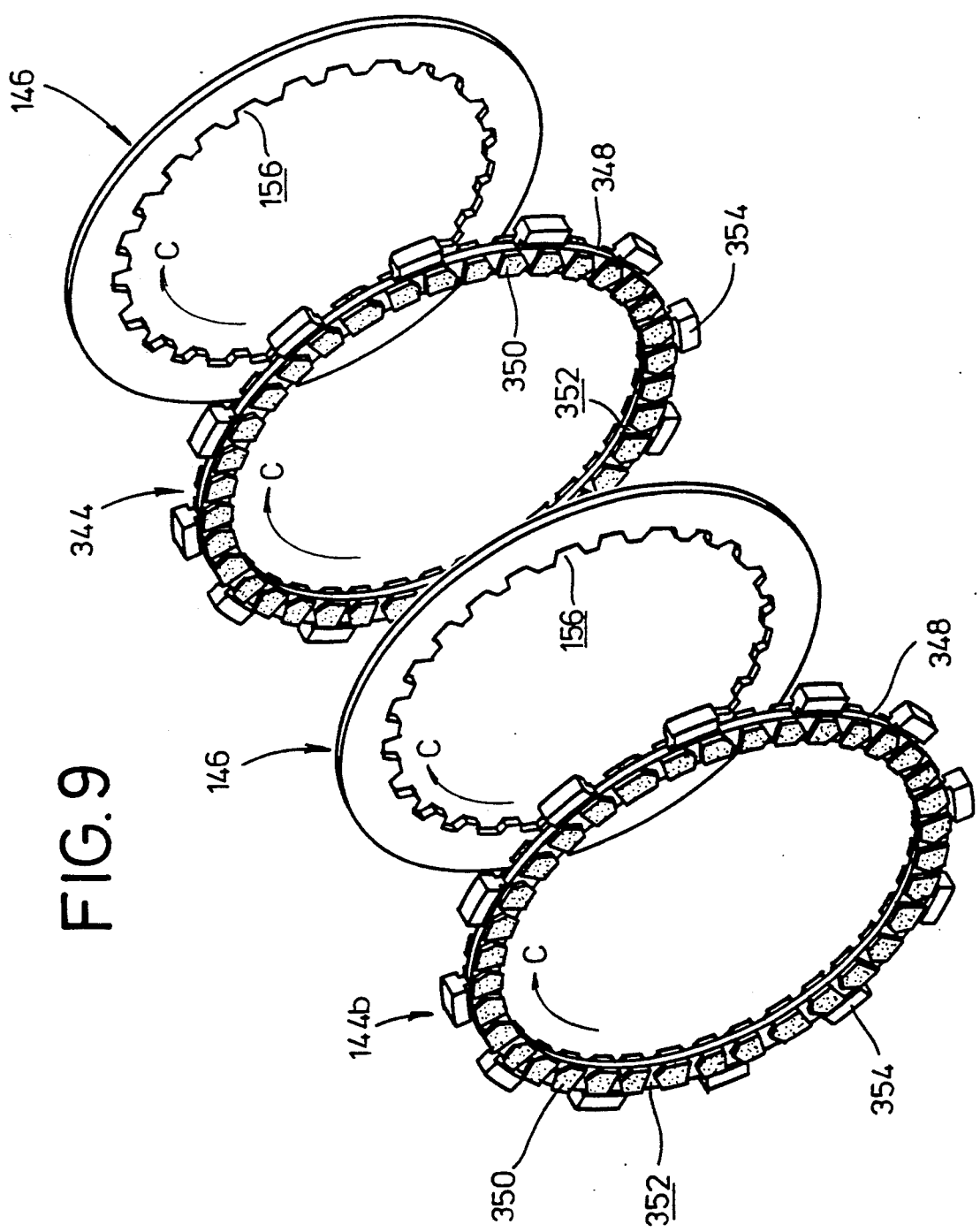
FIG. 9 is an exploded perspective view of clutch discs and clutch plates according to still another embodiment for use in the wet-type multiplate clutch shown in FIG. 3.
Figure 10:
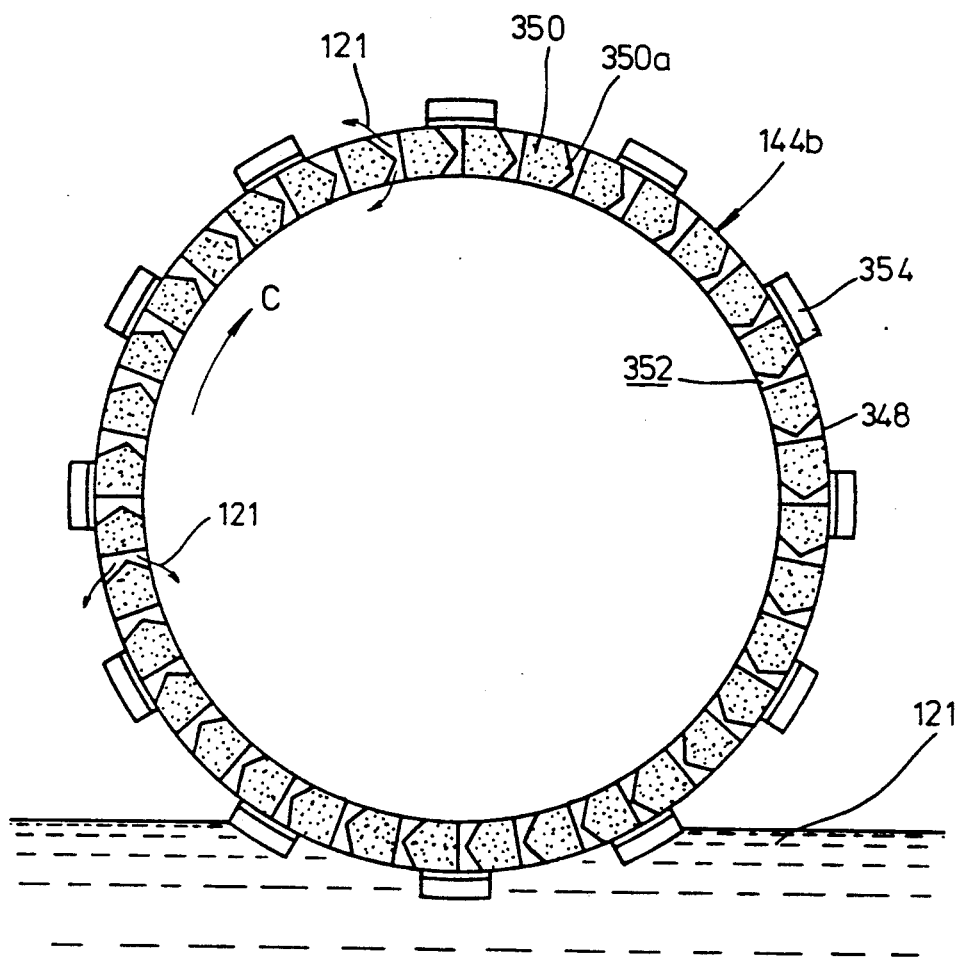
FIG. 10 is a front elevational view of one of the clutch discs shown in FIG. 9.

FIGS. 9 through 10 illustrate clutch discs according to still another embodiment of the present invention, for use in the wet-type multiplate clutch shown in FIG. 3.

Each of clutch discs 144b comprises a disc plate 348 having a central circular opening defined therein and a plurality of frictional members 350 attached to each of the opposite surfaces of the disc plate 348. The frictional members 350 are each in the form of a sheet of sintered metal or paper impregnated with a resin.

Between the frictional members 350, there are defined a plurality of oil passages 352 extending radially outwardly from the inner peripheral edge to outer peripheral edge of the clutch disc 144b. Each of the frictional members 350 has a pointed end 350a tapered or progressively narrower in width in the direction (indicted by the arrow C) of rotation of the clutch disc 144b. The disc plate 348 has on its outer circumferential surface a plurality of engaging teeth 354 spaced at prescribed intervals and engaging respectively in the grooves 132 (see FIG. 3) of the side wall of the outer clutch member 122.

The frictional members 350 pass through the splashed oil 121 supplied from the oil supply passage 141 in the main shaft 134 (see FIGS. 3 and 10). The oil 131 which has entered the oil passages 352 flows in the directions of the arrows (FIG. 11) from the pointed ends 350a of the frictional members 350 as the clutch disc 144b rotates. When the clutch lever 170 is gripped for a gear shift, since stresses produced by the oil 121 are concentrated on the pointed end 350a of the frictional members 350, the clutch plates 146 start being quickly separated from the clutch discs 144b from the pointed ends 350a. As a result, the gear shift can quickly be carried out.

When the clutch lever 170 is released after the gear shift, the clutch plates 146 are pressed against the clutch discs 144b under the bias of the spring 160 (FIG. 3). Since the oil 131 effectively flows from the ends 350a over the frictional surfaces of the frictional members 350, at this time, the clutch discs 144b and the clutch plates 146 are smoothly engaged. The durability of the clutch discs 144b is increased as frictional heat produced when the clutch discs 144b and the clutch plates 146 are engaged is removed by the oil 121.

Figure 11:
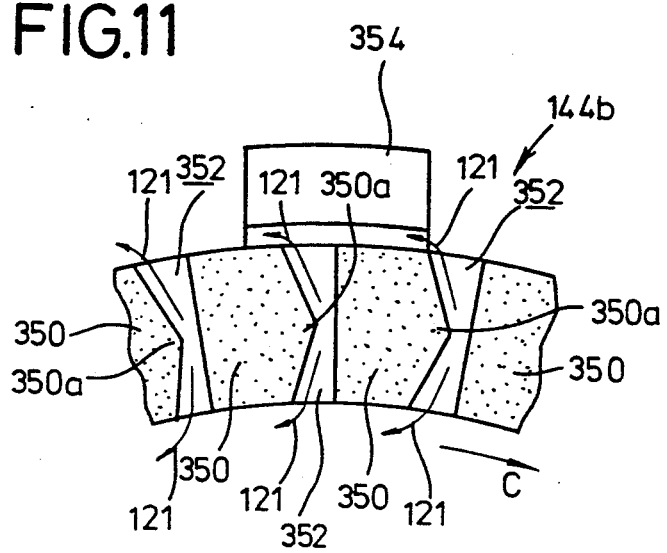
FIG. 11 is an enlarged fragmentary front elevational view of the clutch disc shown in FIG. 10.
Figure 12A:
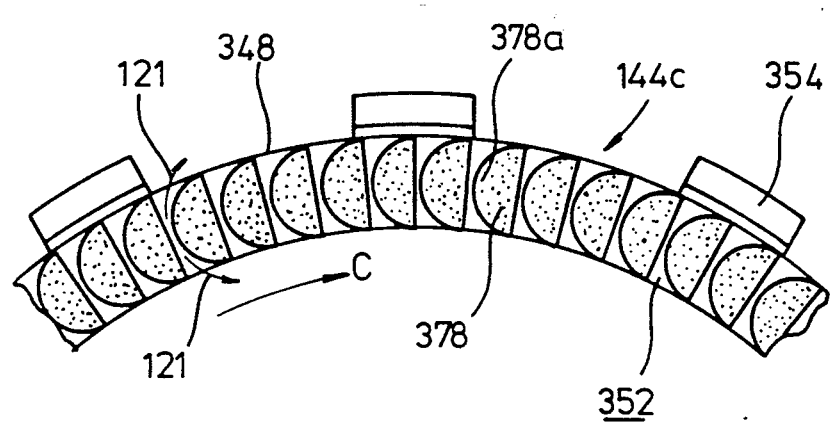
FIGS. 12(a) through 12(d) are enlarged fragmentary front elevational views of clutch discs according to other embodiments of the present invention.

FIG. 12(a) fragmentarily shows a clutch disc according to another embodiment of the present invention. The clutch disc, generally denoted at 144c, has a plurality of frictional members 378 on each of its opposite surfaces. Those parts which are identical to those of the clutch disc 144b of FIGS. 9, 10, and 11 are denoted by identical reference numerals. Each of the frictional members 378 is of a semicircular shape having an arcuate end 378a projecting in the direction opposite to the direction (indicated by the arrow C) of rotation of the clutch disc 144c.

The clutch disc 144c has the following advantages: When the clutch plates 146 and the clutch discs 144c are pressed against each other after a gear downshift, the clutch plates 146 tend to reduce the rotational speed of the clutch discs 144d due to a backward torque applied from the rear road wheel 140, thus applying engine braking. At this time, the oil 121 flowing into the oil passages 352 between the adjacent frictional members 378 flows from the ends 378a of the frictional members 378 in the direction of rotation. Since the force tending to press the clutch plates 146 and the clutch discs 144c against each other is reduced by the oil 121, the backward torque from the rear road wheel 140 is progressively decreased in the wet-type multiplate clutch 120 and then transmitted to the engine 130. The backward torque is thus suitably absorbed by the clutch, allowing the gear downshift to be completed smoothly. The durability of the clutch disc 144c is increased since frictional heat generated by the frictional members 378 is effectively removed by the oil 121.

Figure 12B:
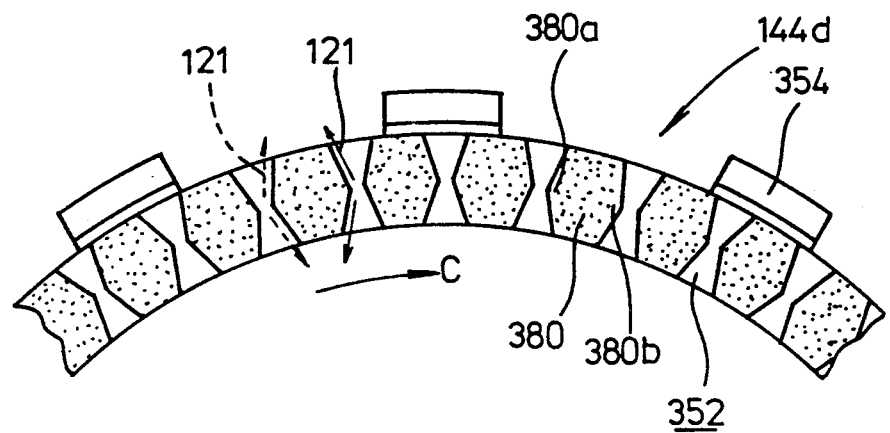

FIG. 12(b) fragmentarily illustrates a clutch disc 144d which combines the function of the clutch disc 144b shown in FIGS. 9 through 11 and the function of the clutch disc 144c shown in FIG. 12(a). More specifically, the clutch disc 144d has a plurality of spaced frictional members 380 each having pointed ends 380a, 380b tapered or progressively narrower in the direction (indicated by the arrow C) of rotation of the clutch disc 144d and in the opposite direction. The clutch disc 144d thus constructed allows the clutch to be engaged and disengaged highly smoothly in an upshift, and can suitably absorb a backward torque from the rear road wheel 140 in a downshift.

Figure 12C:
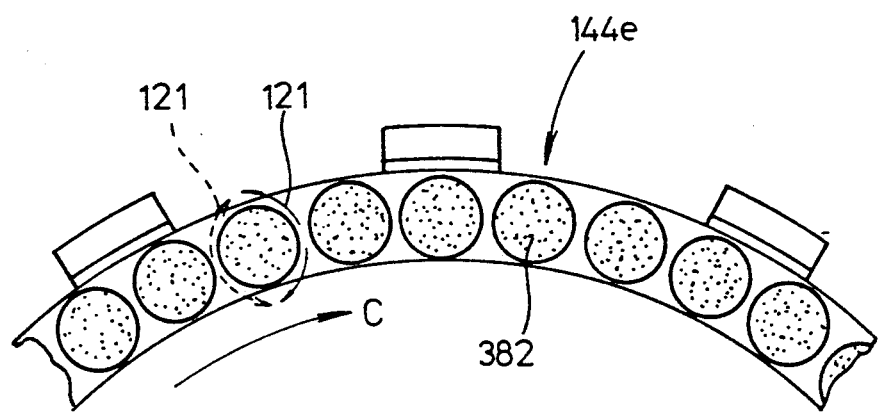
Figure 12D:
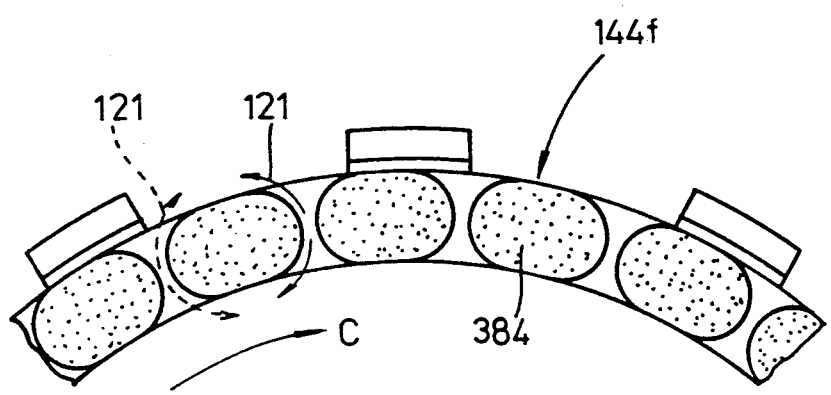
Figure 13:
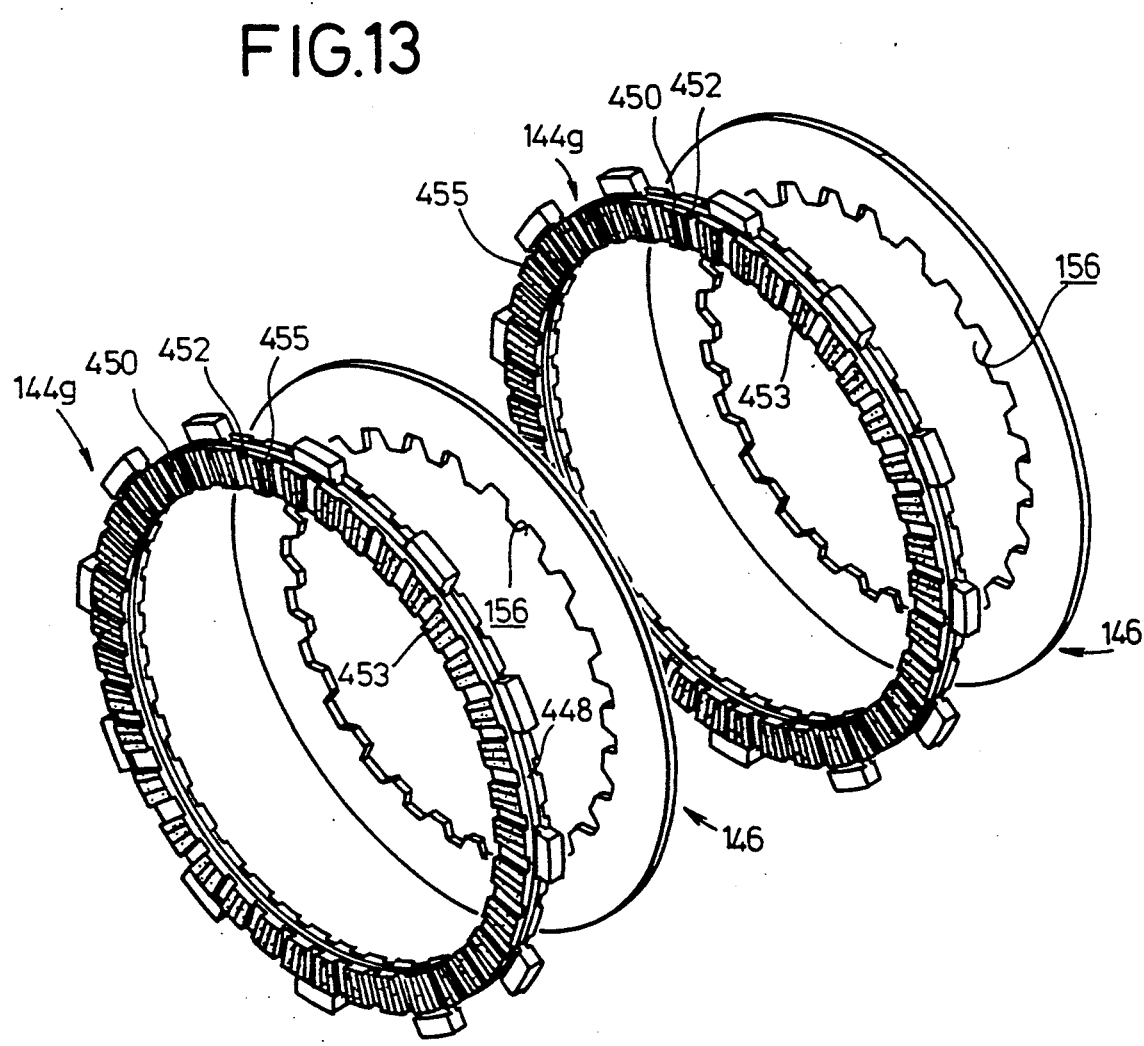
FIG. 13 is an exploded perspective view of clutch discs and clutch plates according to yet another embodiment for use in the wet-type multiplate clutch shown in FIG. 3.
Figure 14A:
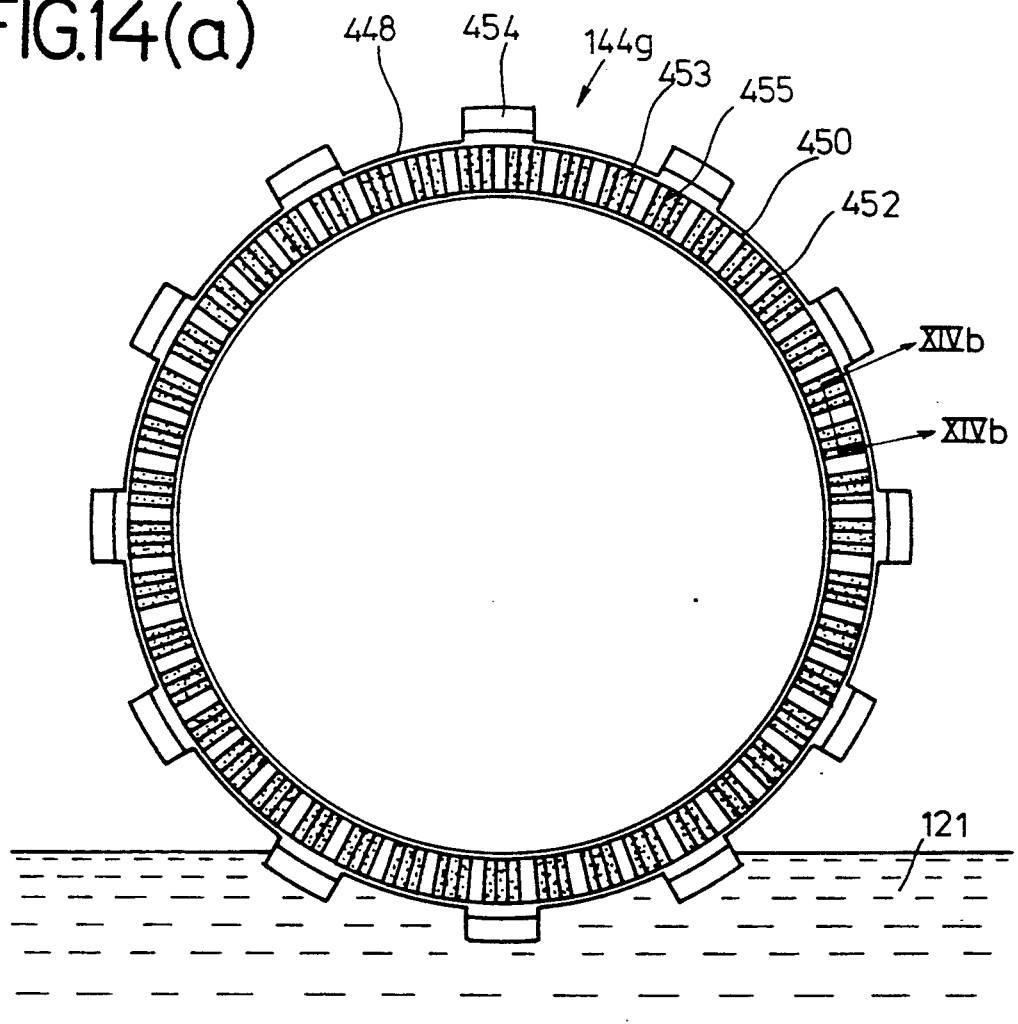
FIG. 14(a) is a front elevational view of one of the clutch discs shown in FIG. 13.
Figure 14C:
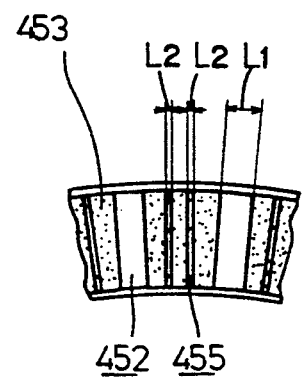
FIG. 14(c) is an enlarged fragmentary front elevational view of the clutch disc shown in FIG. 14(a)
Figure 14B:
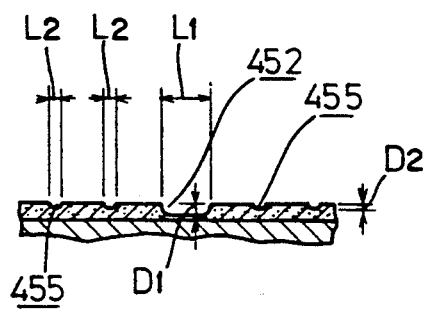
FIG. 14(b) is an enlarged cross-sectional view taken along line XIVb—XIVb of FIG. 14(a)

Substantially the same advantages as those of the clutch disc 144d shown in FIG. 12(b) can be obtained by a clutch disc 144e shown in FIG. 12(c) which has a plurality of spaced frictional members 382 of a circular shape. Alternatively, as shown in FIG. 12(d), a clutch disc 144f may have a plurality of frictional members 384 each of an elliptical or oblong shape which is elongate in the direction (indicated by the arrow C) of rotation of the clutch disc 144f dependent on the capacity of the clutch.

With the above embodiment, as described above, in the wet-type multiplate clutch for selectively transmitting the drive forces from the engine by pressing or separating the clutch discs and the clutch plates, each of the clutch discs has a plurality of frictional members on a frictional surface thereof having ends tapered in the direction of rotation of the clutch disc and/or in the opposite direction, with a plurality of oil passages defined between the frictional members. Where the ends of the frictional) members are oriented in the direction of rotation of the clutch disc, stresses produced by oil is concentrated on the ends, allowing the clutch discs and the clutch plates to be engaged and disengaged quickly. The clutch discs and the clutch plates can smoothly be pressed against each other because the oil flows from the ends over the frictional members. Where the ends of the frictional members are oriented in the direction opposite to the direction of rotation of the clutch disc, a backward torque transmitted from the rear road wheel upon a gear downshift is suitably absorbed by the oil flowing from the ends of the frictional members over the frictional members, thereby permitting the clutch discs and the clutch plates to be engaged highly smoothly. As the clutch discs and the clutch plates are smoothly engaged and disengaged, the amount of wear thereof is very small, and the clutch itself has increased durability.

FIGS. 13 and 14(a) through 14(c) show clutch discs according to yet another embodiment of the present invention, for use in the wet-type multiplate clutch shown in FIG. 3.

Each of the clutch discs, generally represented by 144g, comprises a disc plate 448 having a central circular opening defined therein and a pair of ring-shaped frictional members 450 attached respectively to the opposite surfaces of the disc plate 448. The frictional members 450 are each in the form of a sheet of sintered metal or paper impregnated with a resin.

Each frictional member 450 has a plurality of substantially U-shaped first oil passages 452 defined in an exposed surface thereof and extending radially outwardly in the direction away from the center of the clutch disc 144g from the inner peripheral edge to outer peripheral edge of the frictional member 450. The oil passages 452 have a width of $L_1$ and a depth of $D_1$ (see FIGS. 14(b) and 14(c) and are circumferentially spaced at predetermined intervals. The frictional member 450 also has a plurality of second oil passages 455 defined frictional surfaces 453 defined between the first oil passages 452 and extending radially outwardly from the inner peripheral edge to outer peripheral edge of the frictional member 450. The second oil passages 455 lie parallel to the first oil passages 452, and are in the form of narrower slits. The second oil passages 455 have a width of $L_2$ and a depth of $D_2$ (FIG. 14(b) and 14(c)). The width $L_2$ and the depth $D_2$ of the second oil passages 455 are smaller than those of the first oil passages 452, as can be understood from FIGS. 14(b) and 14(c).

The disc plate 448 has on its outer circumferential surface a plurality of engaging teeth 454 spaced at prescribed intervals and engaging respectively in the grooves 132 of the side wall of the outer clutch member 122.

As described above, the frictional member 450 has the first radial oil passages 452 and the second radial oil passages 455 in the form of narrower slits between the first oil passages 452. Since the oil passages 452 extend all the way to the inner and outer circumferential edges of the frictional member 450, when the oil 121 is supplied from the oil supply passage 141 in the main shaft 134 and splashed into oil droplets, the oil 121 flows through the oil passages 452 under centrifugal forces to cool the clutch discs 144g and the clutch plates 146 even while the clutch discs 144g and the clutch plates 146 are being pressed against each other.

The narrower oil passages 455 in the frictional surfaces 453 are effective in reducing the effective area of contact between the clutch discs 144g and the clutch plates 146 when the clutch 120 is engaged, thus reducing the force with which the clutch discs 144g and the clutch plates 146 are pressed against each other. The pressing force is further reduced by bleeding air and the oil 121 through the oil passages 455. As a result, when the clutch is disengaged, the clutch discs 144g and the clutch plates 146 can smoothly separated from each other. The clutch can thus be disengaged sharply. Shocks applied when the clutch is engaged are also absorbed by the reduced effective area of contact between the clutch discs 144g and the clutch plates 146 and the bleeding effect of the oil passages 455.

Figure 15:
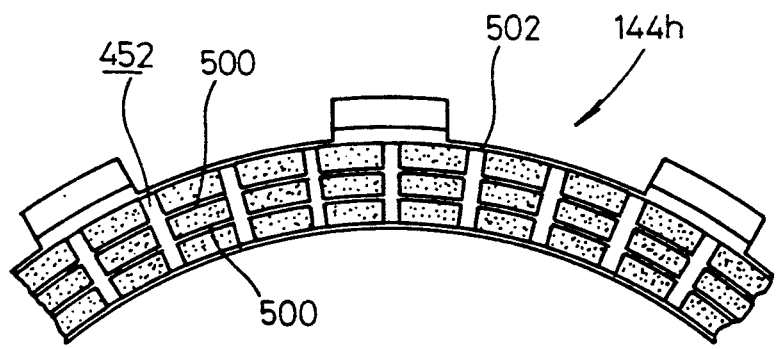
FIGS. 15 through 17 are enlarged fragmentary front elevational views of clutch discs according to other embodiments of the present invention.

FIG. 15 fragmentarily shows a clutch disc according to a further embodiment of the present invention. The clutch disc, generally indicated at 144h, is a modification of the clutch disc 144a shown in FIGS. 13 and 14(a) through 14(c), and has oil passages 500 in the form of narrower slits defined circumferentially in a frictional member 502. The narrower oil passages 500 are also effective in reducing the force with which the clutch discs and the clutch plates are pressed against each other and in bleeding air and oil, so that the clutch can be engaged and disengaged highly smoothly.

Figure 16:
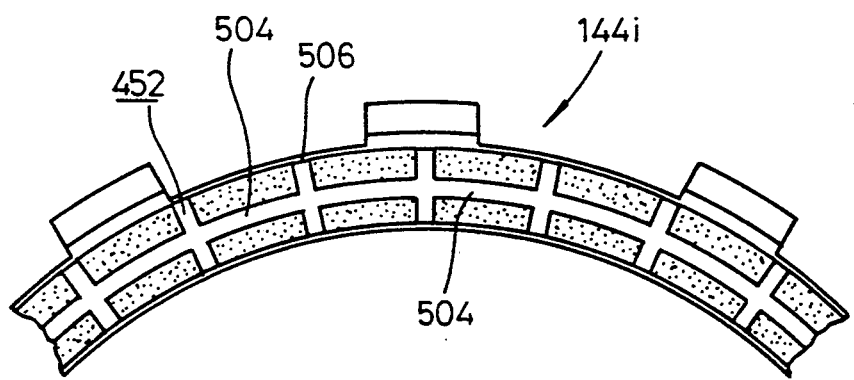

FIG. 16 fragmentarily illustrates a clutch disc in accordance with a still further embodiment, the clutch disc being also a modification of the clutch disc 144a. The clutch disc, denoted at 144i, has an oil passage 504 defined circumferentially in a frictional member 506 and having the same depth and width as those of the radial oil passages 452. With the circumferential oil passage 504 thus defined, the force with which the clutch discs 144i and the clutch plates 146 are pressed against each other is reduced, and the oil 121 tends to remain easily in the oil passage 504. Therefore, the clutch disc 144i can effectively be cooled and is rendered highly durable.

Figure 17:
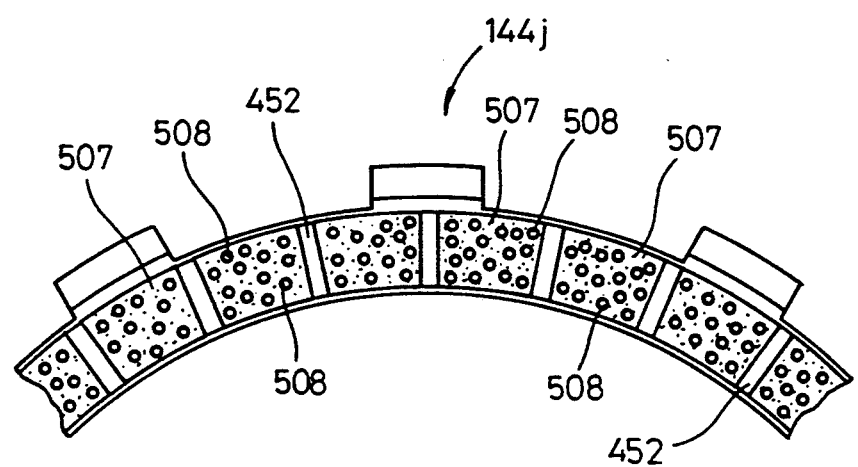

Another clutch disc 144j shown in FIG. 17 is also a modification of the clutch disc 144a. The clutch disc 144j has a plurality of small dimples 508 of a hemispherical shape, for example, defined in a frictional surface 507 between adjacent radial oil passages 452. The dimples 508 serve to reduce the effective area of contact between the clutch discs 144j and the clutch plates 146, thereby decreasing the force with which the clutch discs 144j and the clutch plates 146 are pressed against each other. The clutch disc 144j is cooled by oil 121 retained in the dimples 508, so that the clutch disc 144j has increased durability.

With the embodiments shown in FIGS. 13 through 17, the radial oil passages are defined in the frictional surfaces of the clutch discs at spaced intervals and extend in the direction away from the center of the clutch discs toward the outer circumferential edges thereof, and the other oil passages or oil retainers are defined in the frictional surfaces defined between the radial oil passages. Thus, the effective area of contact between the clutch discs and the clutch plates is reduced to reduce the force with which they are pressed against each other. The narrower oil passages or oil retainers bleed air and oil or retain oil to limit the pressing force between the clutch discs and the clutch plates and also to cool the clutch discs. Consequently, the clutch discs are made highly durable, and the clutch can be engaged and disengaged highly smoothly.

Figure 18:
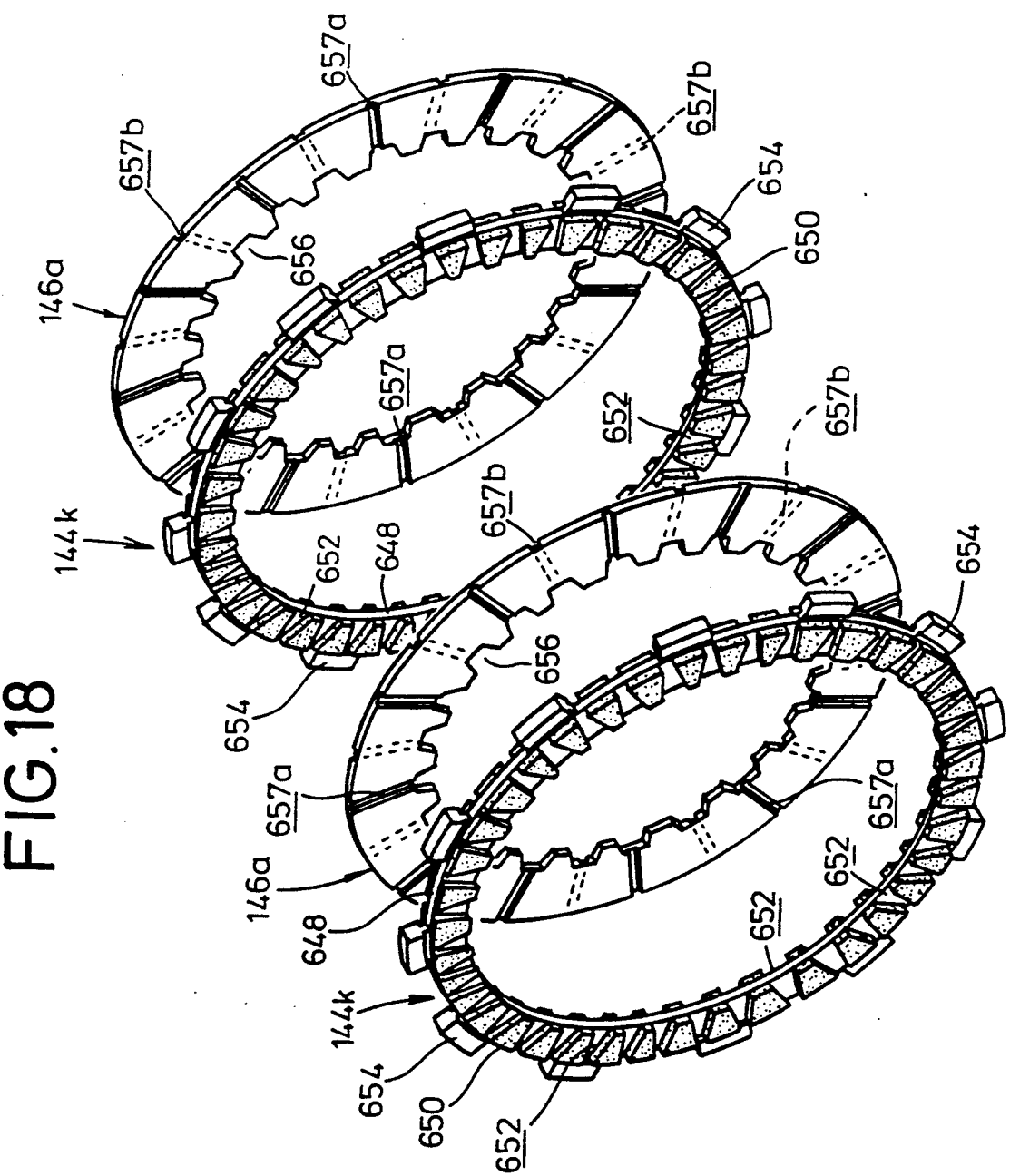
FIG. 18 is an exploded perspective view of clutch discs and clutch plates according to a further embodiment for use in the wet-type multiplate clutch of the present invention.
Figure 19:
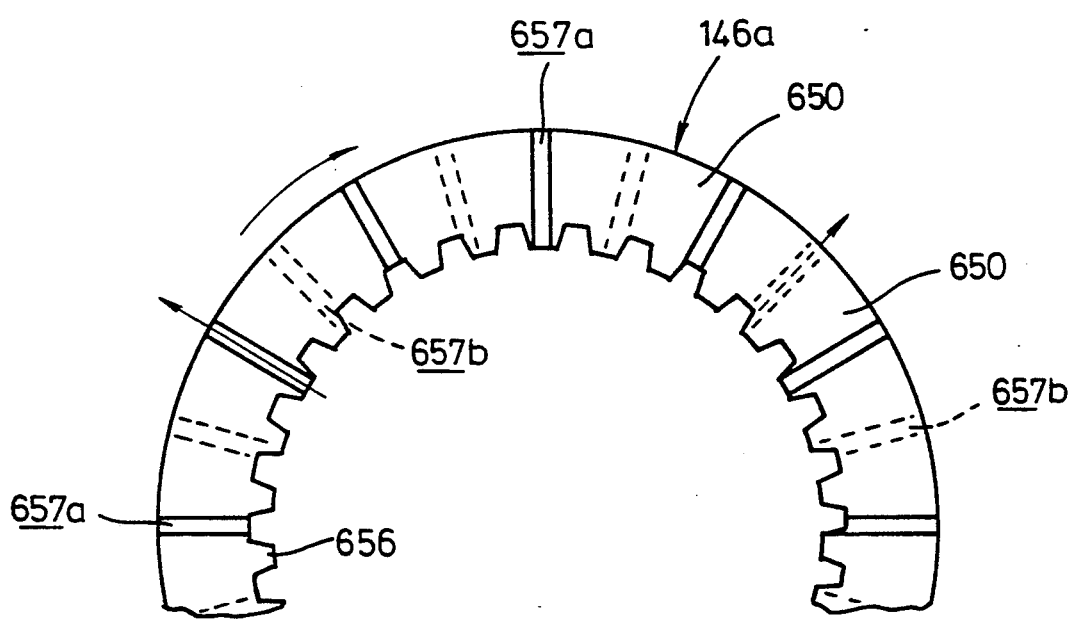
FIG. 19 is an enlarged fragmentary front elevational view of one of the clutch discs shown in FIG. 18.

FIGS. 18 and 19 illustrate clutch discs and clutch plates according to a still further embodiment of the present invention. Each of the clutch discs, indicated by 144k, comprises a disc plate 648 having a central circular opening defined therein and a plurality of frictional members 650 attached to each of the opposite surfaces of the disc plate 648. The frictional members 650 are each in the form of a sheet of sintered metal or paper impregnated with a resin.

Between the frictional members 650, there are defined a plurality of oil passages 652 extending radially outwardly and circumferentially spaced at predetermined intervals. The disc plate 648 has on its outer circumferential surface a plurality of engaging teeth 654 spaced at prescribed intervals and engaging respectively in the grooves 132 of the side wall of the outer clutch member 122. The clutch discs 144k are substantially the same as the clutch discs 144a shown in FIGS. 6 through 8.

Each of the clutch plates, represented by 146a, has a plurality of first radially extending grooves 657a defined in one side surface and spaced at predetermined angular intervals. The first grooves 657a are provided to substantially reduce the area of contact between the clutch disc 144k and the frictional member 650. The first grooves 657a may have a depth which is smaller than the thickness of the clutch plate 146a. Where the first grooves 657a have a relatively small depth, the mechanical strength of the clutch plate 146a is prevented from being unduly lowered.

The clutch plate 146a also has a plurality of second radially extending grooves 657b defined in the opposite side surface and spaced at predetermined angular intervals, the second grooves 657b being positioned out of alignment with or overlapping relation to the first grooves 657a.

The clutch plates 146a are mounted on the central clutch member 124 (FIG. 3) in mesh with the splines 142. Therefore, when the clutch plates 146a are pressed against the clutch discs 144k by the lifter plate 164, rotation of the clutch disc 144k can be transmitted to the central clutch member 124. As a result, the central clutch member 124 rotates with the clutch discs 144k, and the rotation of the central clutch member 124 is transmitted from the main shaft 134 to the rear road wheel 140 through the gear train 136 and the chain 138.

In the above embodiment shown in FIGS. 18 and 19, the radial grooves 657a, 657b are defined respectively in the opposite side surfaces of each of the clutch plates 146a. When the clutch plates 146a and the clutch discs 144k are brought into engagement with each other to transmit the drive forces from the engine 130 to the rear road wheel (FIG. 3), the clutch plates 146a engage the frictional members 650 of the clutch discs 144k through a reduced area of frictional contact. Accordingly, the force with which the frictional members 650 and the clutch plates 146a is reduced, and the clutch discs 144k and the clutch plates 146a can easily and quickly be separated from each other by gripping the clutch lever 170.

The clutch plates 146a are cooled by oil 121 flowing into the grooves 657a, 657b of the clutch plates 146a. When the clutch is rotated, radially outward air flows are developed in the grooves 657a, 657b as indicated by the arrows in FIG. 19 under centrifugal forces. Such air flows and the oil 121 flowing also through the grooves 657a, 657b act to separate the clutch discs 144k and the clutch plates 146a reliably from each other, thereby allowing a smooth gear shift to be effected in connection with the operation of the clutch.

The first and second grooves 657a, 657b are defined in the opposite surfaces of each clutch plate 146a out of overlapping relation to each other. This prevents the clutch plate from being lowered in mechanical strength.

Figure 20:
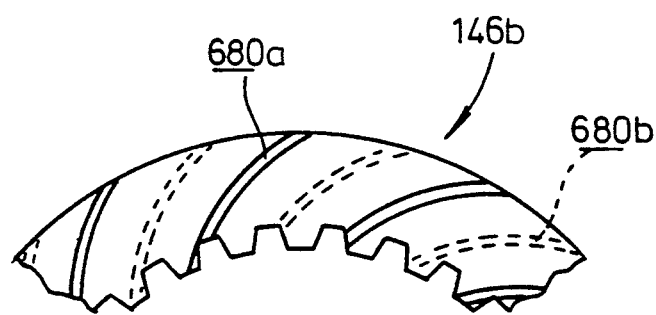
FIGS. 20 through 22 are fragmentary front elevational views of clutch plates according to other embodiments of the present invention.
Figure 21:
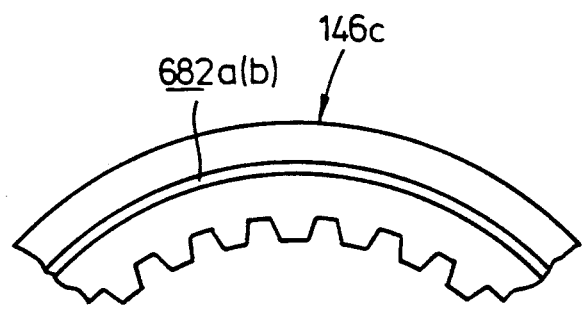
Figure 22:
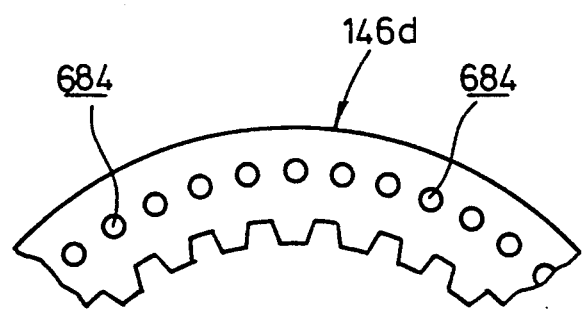

FIGS. 20 through 22 illustrate clutch plates according to other embodiments of the present invention.

According to the embodiment shown in FIG. 20, a clutch plate 146b has a plurality of first curved grooves 680a defined in one side surface thereof and spaced at equal angular intervals, and a plurality of second similarly curved grooves 680b defined in the other side surface and spaced at equal angular intervals, the second curved grooves 680b being positioned out of alignment with or overlapping relation to the first curved grooves 680a. The clutch plate 146b, when used in place of the clutch plate 146a shown in FIG. 18, has a reduced area of contact with the frictional members 650 of the companion clutch disc 144k because of the grooves 680a, 680b of the clutch plate 146b. The same operation and advantages as described above of the clutch plate 146a are obtained by the clutch plate 146b.

FIG. 21 shows another clutch plate 146c having circular grooves 682a, 682b defined in the respective opposite side surfaces thereof concentrically with the clutch plate 146c.

A clutch plate 146d shown in FIG. 22 has a plurality of holes 684 defined therein and spaced at equal angular intervals.

The clutch plates 146c, 146d offer the same advantages as those of the clutch plate 146a, i.e., are well cooled and can easily be separated from the companion clutch disc 144k.

With the embodiments shown in FIGS. 18 through 22, as described above, in the wet-type multiplate clutch for selectively transmitting the drive forces from the engine by pressing or separating the clutch discs and the clutch plates, each of the clutch plates has a plurality of grooves or holes defined therein to reduce a substantial area of contact with the companion clutch disc. The force with which the clutch discs and the clutch plates are pressed against each other is thus reduced. When cutting off the transmission of the drive forces from the engine to the road wheel, the clutch discs and the clutch plates can easily and quickly be separated from each other. Oil flows into the grooves or holes in the clutch plates to cool the clutch plates. Inasmuch as the clutch discs and the clutch plates can reliably be disengaged from each other, wear on the clutch discs and the clutch plates is reduced, so that the clutch can be used over an extended period of time.

Although certain preferred embodiments have been shown and described, it should be understood that many changes and modifications may be made therein without departing from the scope of the appended claims.

What is claimed is:

1. A wet-type multiplate clutch for selectively transmitting drive forces from an engine to a road wheel, comprising:

a plurality of clutch discs adapted to be coupled to the engine and each having a frictional surface;

a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ring-shaped frictional member on said frictional surface, said frictional member defining a plurality of discrete frictional surfaces spaced at predetermined intervals with oil passages being defined between each adjacent frictional surface, said discrete frictional surfaces having respective oil grooves defined therein with a boundary surface extending substantially perpendicularly to the bottom of said oil grooves, said oil grooves opening radially centrally of the clutch disc, and being of a rectangular parallelepiped configuration such that when said clutch discs and said clutch plates are pressed against each other, each of said oil grooves defines a respective volume within said rectangular parallelpiped configuration for retaining oil therein while said clutch is rotated.

2. The wet-type multiplate clutch according to claim 1, wherein oil flowing through said oil passages under a centrifugal force cools the clutch discs and the clutch plates.

3. The wet-type multiplate clutch according to claim 1, wherein said volume defined by each of said oil grooves is substantially greater than the volume of each oil passage.

4. A wet-type multiplate clutch for selectively transmitting drive forces from an engine to a road wheel, comprising:

a plurality of clutch discs adapted to be coupled to the engine and each having a frictional surface;

a plurality of clutch plates adapted to be coupled to the road wheel, said clutch discs and said clutch plates being alternately interleaved and arranged so that the clutch discs and the clutch plates can be pressed against and separated from each other; and each of said clutch discs having a ring-shaped frictional member on said frictional surface, said frictional member defining a plurality of discrete frictional surfaces spaced at predetermined intervals with oil passages being defined between each adjacent frictional surface, said discrete frictional surfaces having respective oil grooves defined therein with a boundary surface extending substantially perpendicularly to the bottom of said oil grooves, said oil grooves opening radially centrally of the clutch disc, and being of a predetermined configuration such that when said clutch discs and said clutch plates are pressed against each other, each of said oil grooves defines a respective volume for retaining oil therein while said clutch is rotated and wherein said volume defined by each of said oil grooves is a cavity bounded on all sides thereof except a side opening radially centrally of the clutch disc.

5. The wet-type multiplate clutch according to claim 4, wherein said oil grooves are substantially U-shaped recesses extending into the surface of said friction member and being in communication with oil for cooling said friction member.

6. The wet-type multiplate clutch according to claim 5 wherein the width of said substantially U-shaped recesses is greater than the width of said oil passages.

7. The wet-type multiplate clutch according to claim 5, wherein oil within said substantially U-shaped recesses is subjected to centrifugal forces while the clutch is rotated and develops an oil pressure commensurate with the kinetic energy applied to the oil.

* * * * *

UNITED STATES PATENT AND TRADEMARK OFFICE
CERTIFICATE OF CORRECTION

PATENT NO. : 5,094,331
DATED : March 10, 1992
INVENTOR(S) : Katsumi Fujimoto, Hisanori Esaki, Kunihiko Azuma, Yusuke Oishi, Yasutada Suzuki It is certified that error appears in the above-identified patent and that said Letters Patent is hereby corrected as shown below:

On the title page, item [73] Assignees:
change "Honda Giken Kogyo Kabushi Kaisha," to -- Honda Giken Kogyo Kabushiki Kaisha, --

Signed and Sealed this

Sixth Day of July, 1993

Attest:

MICHAEL K. KIRK

*Attesting Officer*          *Acting Commissioner of Patents and Trademarks*